United States Patent
Nebon et al.

(10) Patent No.: US 6,291,783 B1
(45) Date of Patent: *Sep. 18, 2001

(54) ELECTRICAL SWITCHGEAR APPARATUS COMPRISING A PLUG-IN CIRCUIT BREAKER AND A DEVICE INDICATING THE STATE OF THE CIRCUIT BREAKER

(75) Inventors: Jean-Pierre Nebon, Saint Martin d'Heres; Claude Grelier, Grenoble; Jean-Pierre Nereau, Seyssinet; Jacques Joubert, Montbonnot, all of (FR)

(73) Assignee: Square D. Company, Palatine, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 22 days.

(21) Appl. No.: 09/362,728
(22) Filed: Jul. 29, 1999

(30) Foreign Application Priority Data

Aug. 24, 1998 (FR) .................................................. 98 10735

(51) Int. Cl.$^7$ ...................................................... H01H 9/20
(52) U.S. Cl. ........................ 200/50.26; 200/308; 200/400
(58) Field of Search ................................. 200/17 R, 500, 200/501, 400, 401, 50.21–50.26, 308; 361/605–609, 615, 618, 619

(56) References Cited

U.S. PATENT DOCUMENTS

| | | | |
|---|---|---|---|
| 4,236,189 | 11/1980 | Yosida | 361/337 |
| 4,744,001 * | 5/1988 | Krafft et al. | 361/338 |
| 5,206,468 * | 4/1993 | Kobayashi et al. | 200/50 AA |
| 5,661,627 * | 8/1997 | Liebetruth et al. | 361/115 |
| 5,823,323 * | 10/1998 | Seymour et al. | 200/308 |
| 5,981,887 * | 11/1999 | Robarge et al. | 200/308 |
| 6,005,208 * | 12/1999 | Castonguay | 200/308 |

* cited by examiner

Primary Examiner—Michael Friedhofer

(57) ABSTRACT

An electrical switchgear apparatus comprises a fixed frame, a circuit breaker movable in the fixed frame between a plugged-out position and a plugged-in position, a reversible plug-in and plug-out mechanism of the circuit breaker, a movable means for detecting an indexed position of the mechanism or of the circuit breaker, linked to a first electrical switch, and a movable means for detecting an indexed position (open or closed) of the main contact means of the circuit breaker linked to a second electrical switch. Each of the two switches comprises an input, a first output and a switching means able to take a first position in which it connects the input of the switch electrically to the first output of the switch, the switching means being kinematically linked to the corresponding detecting means, in such a way that the switching means is in its first position if and only if the corresponding detecting means is in its active position. The output of one of the switches is connected to the input of the other switch. A state indicating device is thus achieved with an input terminal, a first output terminal and means designed to electrically connect the input terminal and the first output terminal if and only if the main contact means and the switchgear apparatus are simultaneously in their indexed position.

9 Claims, 12 Drawing Sheets

ELECTRICAL SWITCHGEAR APPARATUS COMPRISING A PLUG-IN CIRCUIT BREAKER AND A DEVICE INDICATING THE STATE OF THE CIRCUIT BREAKER

BACKGROUND OF THE INVENTION

The invention relates to an electrical switchgear apparatus comprising a fixed frame and a circuit breaker movable in the fixed frame between a plugged-out position and a plugged-in position, the circuit breaker comprising at least one pair of main contact means at least one of which is movable and can take with respect to the other a closed position corresponding to electrical conduction and an open position corresponding to breaking.

The Patent application FR-A-2,416,575 describes a switchgear apparatus of this type comprising in addition a state indicating device with an input terminal, a first output terminal and operating means designed to electrically connect the input terminal and the first output terminal when the circuit breaker is in an indexed position with respect to the frame—i.e. the plugged-in position—and that the circuit breaker main contacts are in their closed state. The state indicating device comprises a junction unit secured to the frame and a kinematic link with the main contact means of the circuit breaker. The junction unit comprises the input terminal and the output terminal, which are connected as a bridge by a corresponding pair of movable contacts securedly united and connected to one another. According to the position given to the pair of movable contacts, the bridge is conducting or not. The kinematic link comprises a lever pivoting around a spindle secured to the frame of the switchgear, one end of which acts on the pair of movable contacts of the junction unit and the other end of which is shaped as a fork which engages in a crank secured to the main movable contact means of the circuit breaker when the circuit breaker reaches its plugged-in position. When the circuit breaker is not in its plugged-in position, the lever is not biased by the crank and is blocked in a rest position by a slide. When the slide reaches the plugged-in position, it is repelled by a stop securedly affixed to the circuit breaker and releases the lever. The position of the lever is then imposed by that of the crank: if the main contact means are open, the crank is in a position such that the lever remains in its rest position. When the main contact means are reclosed, the crank pivots driving the lever which modifies the position of the pair of movable contacts of the junction unit.

To modify the choice of the indexed position, the size of the lever can be modified in such a way that cooperation with the crank begins earlier, for example in the test position in which the main terminals of the circuit breaker are separated whereas auxiliary terminals of control circuits of the circuit breaker are connected. In this case, the information supplied by the junction unit is different: the bridge is conducting if the Circuit breaker is situated somewhere between its test position and its plugged-in position and if at the same time the main contact means are closed.

The indicating device therefore has limited functions: it is not designed for example to deliver information characteristic of the fact that the circuit breaker is in the test and closed position. Moreover, it is bulky, which limits its use in practice. Indeed, today it is required to be able to meet various user requirements, and in particular to be able to juxtapose different state indicating devices giving different information on the state of the switchgear apparatus: one for example on the fact that the circuit breaker is closed and plugged-in; another on the fact that the circuit breaker is in the test and closed position; another on the fact that the circuit breaker is situated between the plugged-out position and the test and open position. With the device of the prior state of the technique, such a juxtaposition would involve a multiplicity of kinematic links, and therefore levers of large dimensions. Such a device would be too bulky, too fragile and too costly. Furthermore, the device described up to now does not enable the state indicating device to be positioned with sufficient freedom with respect to the frame. However all the auxiliary contacts of a frame, of which the indicating device is a part, are now required to be disposed on a single terminal block, which in practice imposes positioning constraints incompatible with the architecture described.

SUMMARY OF THE INVENTION

The purpose of the invention is therefore to overcome the drawbacks of the state of the technique and in particular to achieve an extractable switchgear apparatus of the previous type comprising an integrated state indicating device of small dimensions, which is inexpensive and enables varied uses, without jeopardizing the main quality of the prior device, i.e. its reliability.

According to the invention, this problem is solved by means of an electrical switchgear apparatus comprising a fixed frame, a circuit breaker movable in the fixed frame between a plugged-out position and a plugged-in position, a reversible plug-in and plug-out mechanism of the circuit breaker, able to take a plurality of positions, a movable means for detecting one of the positions of the mechanism or of the circuit breaker, called the "indexed position", or respectively an interval of positions of the mechanism or circuit breaker, called the "indexed position interval", able to take an active position if and only if the mechanism or circuit breaker is situated in said indexed position, respectively within said indexed position interval, the circuit breaker comprising at least one pair of main contact means able to take a closed position corresponding to electrical conduction and an open position corresponding to breaking, the switchgear apparatus in addition comprising a movable means for detecting one of said positions of the pair of main contact means, called the "indexed position", able to take an active position If and only if the pair of main contact means is located in said indexed position, and a state indicating device comprising an input terminal "e", a first output terminal "$s_1$" and means designed to electrically connect the input terminal and the first output terminal if and only if the means for detecting the position of the circuit breaker and the means for detecting the position of the pair of main contact means are both in their active position, the state indicating device comprising a first switch connected to the means for detecting the position of the plug-in and plug-out mechanism, a second switch connected to the means for detecting the position of the pair of main contact means, and an electrical circuit connected between the first switch, the second switch and the terminals "e", "$s_1$" of the state indicating device, each of the two switches comprising an input, a first output and a switching means able to take a first position in which it electrically connects the input of the switch to the first output of the switch, the switching means being kinematically connected to the corresponding detecting device in such a way that the switching means is in its first position if and only if the corresponding detecting means is in its active position. Due to the two switches, it is possible to make the mechanical state of the movable detecting means correspond to a state of the electrical connection circuit. The circuit connecting the two switches and the terminals of the state indicating device enable information to be conveyed between the two detecting devices in the form of an electrical signal, and the lever of the prior art to be therefore eliminated.

Preferably, the input of one of the two switches, called the line-side switch, is connected to the input terminal of the state indicating device, the first output of the other switch, called the load-side switch, is connected to the first output terminal of the state indicating device, and the first output of the line-side switch is connected to the input of the load-side switch. This arrangement enables the logic "AND" function sought for to be achieved in particularly simple and reliable manner.

Preferably, the state indicating device comprises a first case comprising the input terminal and the first output terminal and also one of the two line-side and load-side switches. This arrangement enables the invention to be achieved practically using standard switch cases, modifying one of these cases very slightly.

According to a preferred embodiment, each switch comprises a second output, wherein for each switch the switching means is able to take a second position in which it does not connect the input to the first output, and electrically connects, in its second position, the input of the switch to the second output of the switch, and the state indicating device comprises a second output terminal, the second output of the load-side switch being connected to the second output terminal of the state indicating device, and the second output of the line-side switch being connected to the second output of the load-side switch. This arrangement enables a complementary signal corresponding to the "circuit breaker out of its indexed position" OR "main contact means out of their indexed position" event to be obtained very simply. This signal, which corresponds to a user requirement, is obtained here without increasing the number of switches. The state indicating device then only comprises three terminals, whereas four would have been required if two state of the technique devices had been juxtaposed. In this context, it is advantageous to provide for the state indicating device to comprise a first case comprising the input terminal and the two output terminals and also one of the two line-side and load-side switches, which enables a very high degree of integration of the different elements of the device.

In addition, it can be provided for the state indicating device to comprise a second case comprising the other switch.

Preferably, the circuit breaker comprises auxiliary connectors designed for connection of auxiliary electrical circuits of the circuit breaker to the frame, the frame comprising a terminal block for connection to the auxiliary connectors and a customer connection terminal block, the first case being disposed in one of said terminal blocks. The case is then particularly accessible. In this case, it is advantageous for the first case to comprise the first switch. The location of the terminal blocks in fact enables the movable means of the mechanism or circuit breaker position detector to be actuated by means of a simple and short kinematic system.

According to one embodiment, the kinematic connecting means of one of the two switches at least comprise flexible return means. These return means act simultaneously on the detection means and on the switching means to return them to one of the active or passive positions.

Finally, in preferred manner, the line-side switch is the first switch.

BRIEF DESCRIPTION OF THE DRAWINGS

Other advantages and features of the invention will become more clearly apparent from the following description of different embodiments of the invention, given as non-restrictive examples only and represented in the accompanying drawings in which.

DETAILED DESCRIPTION OF THE PREFERRED EMBODIMENT

Figure 1:
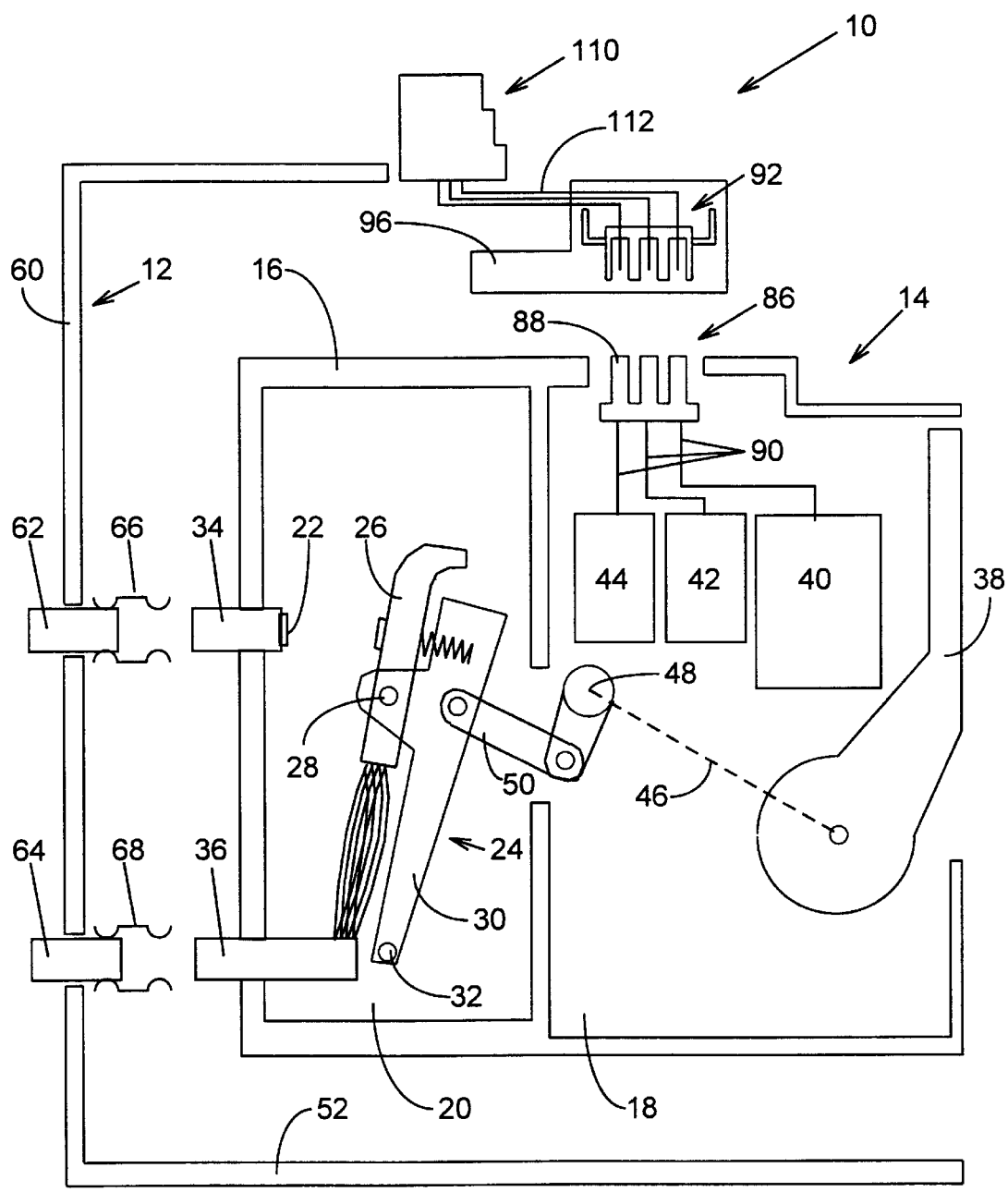
FIG. 1 schematically represents a cross sectional view of a switchgear apparatus according to a first embodiment of the invention, comprising a plug-in circuit breaker and its frame.

With reference to FIG. 1, a low-voltage electrical switchgear apparatus 10 comprises a fixed frame 12 designed to be placed for example in an electrical cabinet and a plug-in circuit breaker 14 movable in translation inside the frame 12. The circuit breaker 14, of high rating, notably up to 6000 Amps, is housed in a case 16 made of insulating material subdivided into a front compartment 18 and a rear compartment 20. The rear compartment 20 houses one or more poles each comprising a pair of main contact means with a stationary contact means 22 and a movable contact means 24. The movable contact means 24 comprises a plurality of contact fingers 26 pivotally mounted around a spindle 28 securedly united to a contact tunnel 30 itself mounted pivoting around a fixed spindle 32. Each contact means 22, 24 is electrically connected to a corresponding electrical terminal 34, 36 of the circuit breaker. A more detailed description of the structure of the poles can be found in the document FR-A-2,650,434, the account of which is incorporated here on this point by reference. The front compartment 18 contains an operating device with a setting lever 38 of an energy storage system (not represented), an electronic trip device 40 causing automatic tripping when a fault current, in particular an overload, short-circuit or earth fault occurs, and electrical measuring, indication and monitoring auxiliaries 42, 44, in particular auxiliaries indicating tripping or the state of the circuit breaker. The operating device, represented in broken lines in 46, acts on a pole shaft 48, which in turn acts on each of the movable contact means 24 by means of a rod 50. An open position of each of the movable contact means 24 corresponds to a first angular position of the pole shaft 48. A closed position of all the movable contact means 24 corresponds to a second angular position of the pole shaft 48. For a more precise description of the operating device 46, reference should be made to the document EP-A-0,222,645 the account of which is incorporated here on this point by reference.

Figure 2:
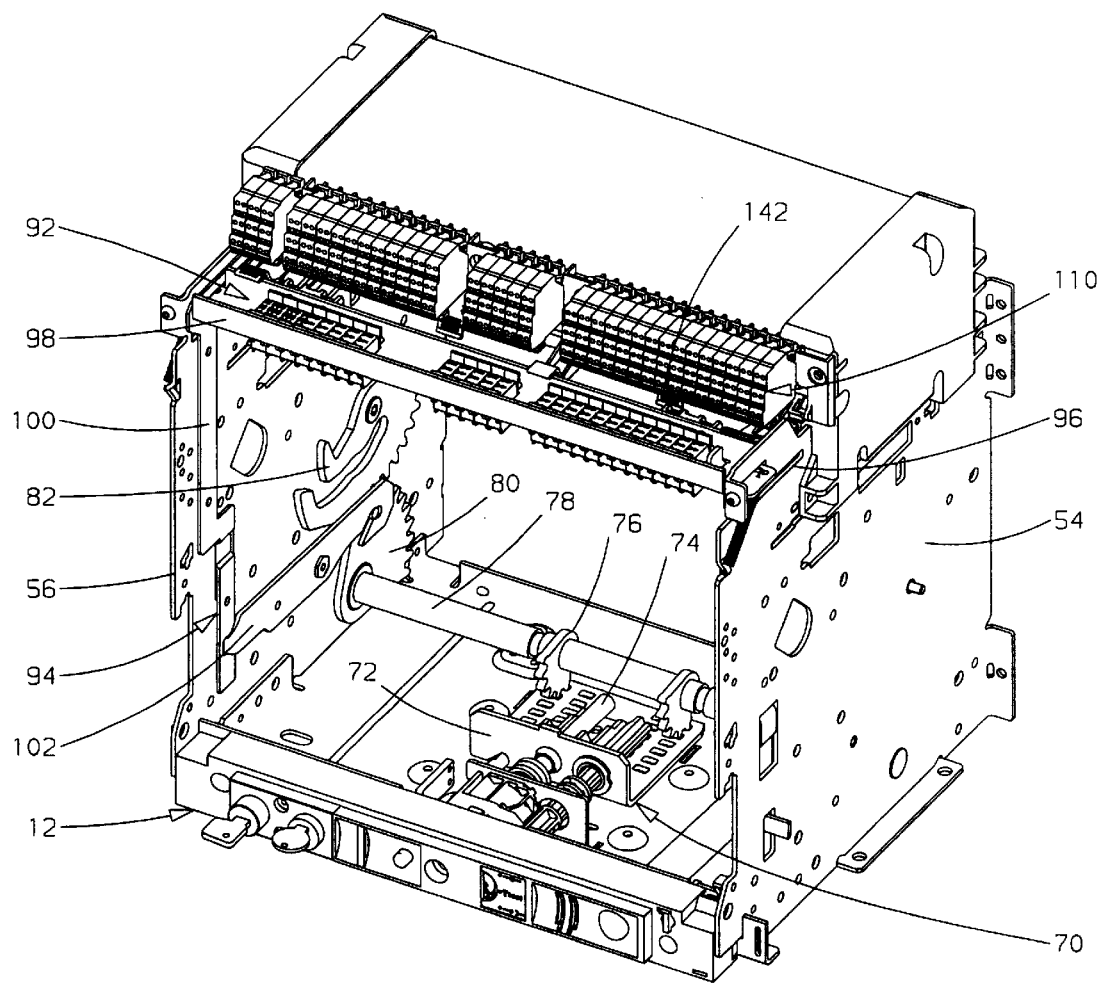
FIG. 2 represents in perspective the frame of the apparatus of FIG. 1.

The frame 12 in the form of an open housing represented in greater detail in FIG. 2 comprises a base plate 52 and two opposite side walls 54, 56 bounding a front opening for insertion or removal of the plug-in circuit breaker. The side walls 54, 56 are provided with draw-in slides designed to support and guide the circuit breaker in its movement. These slides 58 can be seen in FIG. 3 but have been removed in FIG. 2, so as to reveal other elements of the switchgear unit. Opposite the front opening there is located an insulating connecting base 60 forming the bottom of the frame, through which fixed connection strips 62, 64 pass equipped with draw-in finger contacts 66, 68. The fixed strips 62, 64 are designed to be connected to a busbar of the electrical cabinet. In the drawn-in position of the circuit breaker 14, the terminals 34, 36 of the circuit breaker are engaged in the draw-in finger contacts 66, 68 which provide the electrical contact with the fixed strips 62, 64. The frame 12 supports a draw-in mechanism 70 comprising a crown-wheel device 72 cooperating with a control screw 74 able to be actuated by a crank, not represented. The crown-wheel device 72 drives pinions 76 secured to a transverse plug-in shaft 78. The shaft also supports at each of its ends a counter-pinion 80 engaging with a toothed sector of a draw-in cam 82. Each draw-in cam 82 is mounted pivoting around a spindle 84 securedly affixed to the frame.

In addition to the main terminals 34, 36, the circuit breaker comprises an auxiliary connecting device 86, able to establish or interrupt the electrical connection between on the one hand the auxiliaries and the trip device and on the other hand external remote control and monitoring means. The connection device is provided with a plurality of fixed auxiliary connectors 88 connected by wiring conductors 90 to the different auxiliaries 42, 44 and to the electronic trip device 40. The auxiliary connectors 88 are fixed at the level of the upper wall of the circuit breaker case 16.

The fixed auxiliary connectors 88 of the circuit breaker cooperate by plugging-in with a movable terminal block 92 associated to a guide device 94 forming part of the draw-in mechanism 70. This guide device 94, which can be seen in FIGS. 3 to 5, comprises an L-shaped guide slide 96 made in each of the side walls 54, 56 of the frame, and a cross-member 98 supporting the movable terminal block 92. The cross-member 98 cooperates with two vertical transmission rods 100 each guided in translation along a side wall of the frame. The end of a lever 102 is articulated at the bottom end of each rod 100, the other end of said lever comprising a hook 104 cooperating with a spigot 106 fixed onto the corresponding counter-pinion 80. The upper end of each rod 100 comprises a horizontal slide rack 108 cooperating with one end of the cross-member 98, which also cooperates with the L-shaped slide 96. In the upper part of the frame there is disposed a fixed connection terminal block 110 designed for electrical connection with the remote control and monitoring means. A bundle of flexible conductors 112 electrically connects the movable terminal block 92 with the connection terminal block 110.

Figure 3:
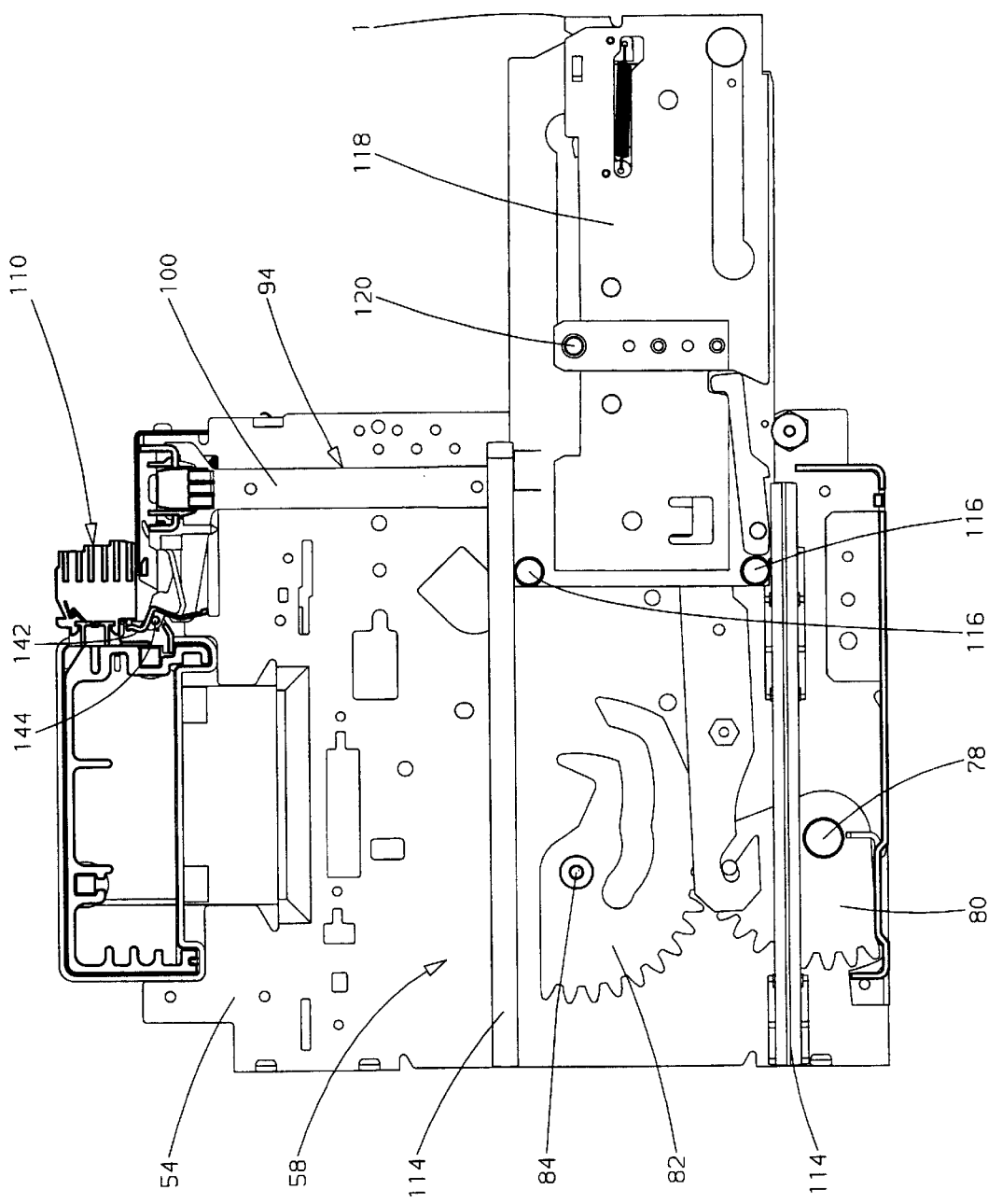
FIG. 3 represents certain elements of the frame in an "extracted" state of the apparatus of FIG. 1.

The circuit breaker 14 is guided in translation with respect to the frame by means of the draw-in slides 58. These slides, which can be seen in FIG. 3, are formed on each side by two parallel rails 114 which cooperate with rollers 116 secured to a support arm 118 of the circuit breaker. The sliding arm 118 comprises notches designed to cooperate with corresponding spigots of the circuit breaker to enable the latter to be held in position, and also a crankpin 120 designed to cooperate with the draw-in cam 82.

Figure 4:
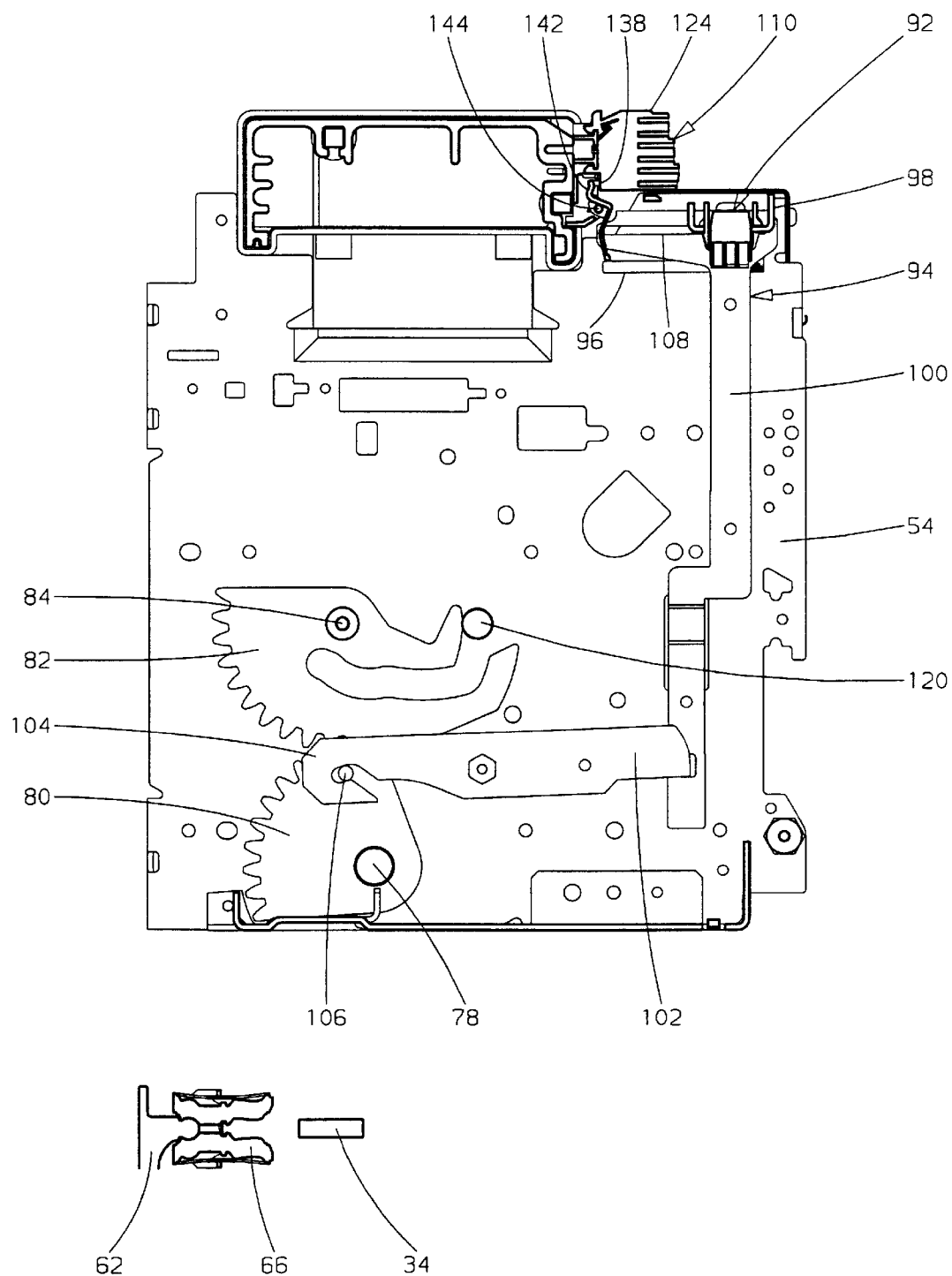
FIG. 4 represents certain elements of the frame in an "plugged-out" state of the apparatus of FIG. 1.
Figure 5:
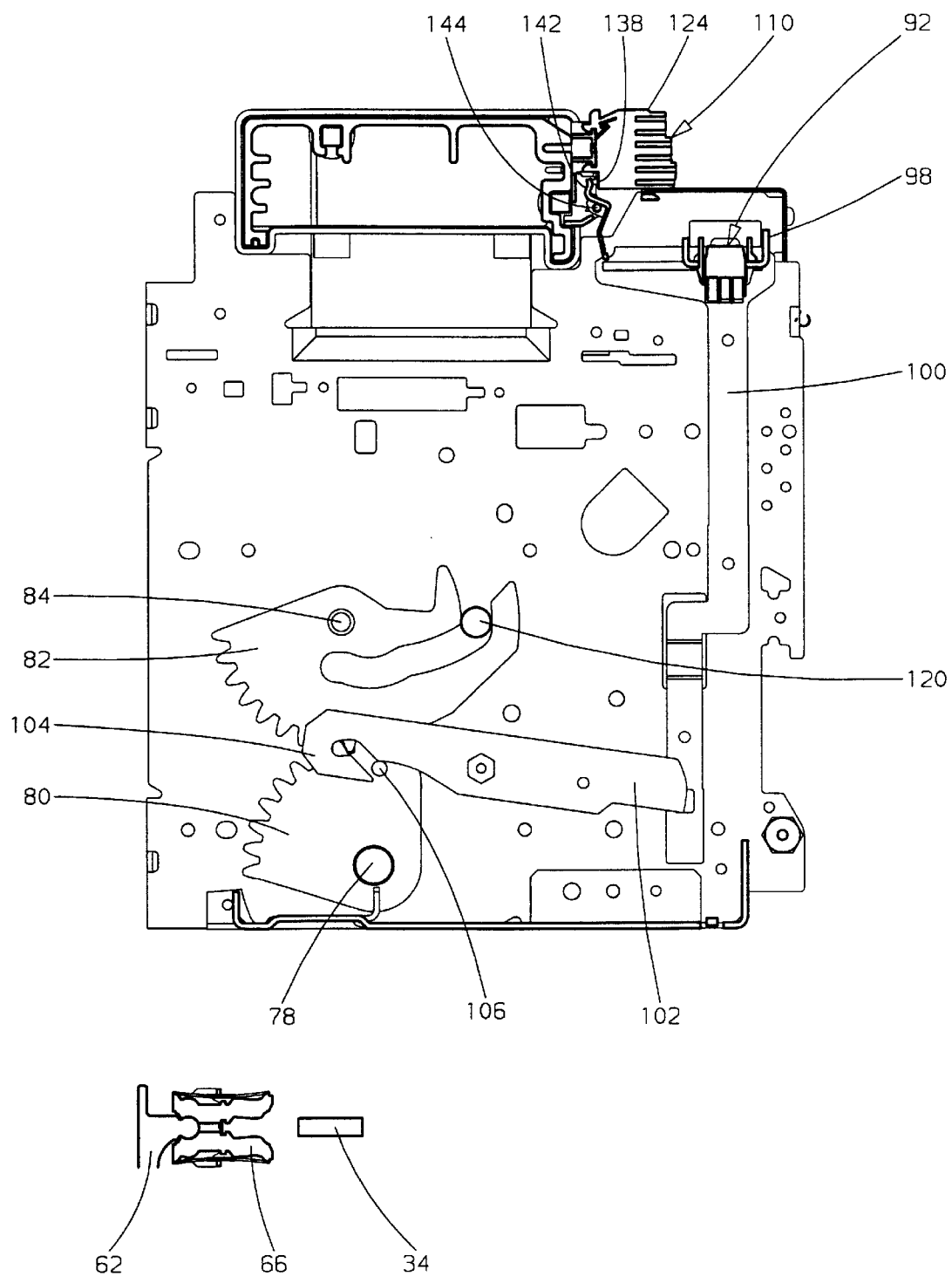
FIG. 5 represents certain elements of the frame in a "test" state of the apparatus of FIG. 1.

The circuit breaker 14 is able to occupy several positions with respect to the frame 12 staggered along the longitudinal draw-in direction, and in particular: an extracted position, corresponding to full extension of the support arms visible in FIG. 3, a plugged-out position with or without test, and a plugged-in position. In the extracted position, it is possible to proceed with extraction of the circuit breaker by removing the latter from the slides. From this position, the circuit breaker is pushed manually to the plugged-out position, in which the crankpins 120 press against the draw-in cams. The plugged-out position of the apparatus has been represented schematically in FIG. 4, by removing the sliding support arms and the circuit breaker, but leaving the crankpin 120. In this position, the terminals 34, 36 of the circuit breaker are at a sufficient disconnecting distance from the draw-in finger contacts 66, 68, as can be seen at the bottom of FIG. 4, which represents a top view of these elements. When the draw-in mechanism is actuated, it generates rotation of the draw-in shaft 78 and cams 82, which act in a first phase only on the vertical rods 100. These rods lower the cross-member 98 to the position represented in FIG. 5 and perform engagement of the movable contact terminal 92 on the auxiliary connectors 86. During this phase, the circuit breaker remains immobile in its plugged-out position, the circuit breaker terminals 34, 36 consequently remaining at the same disconnection distance from the draw-in finger contacts 66, 68 as in the plugged-out state. In a second phase, actuation of the draw-in mechanism 70 performs translational movement of the support arms 118 and of the circuit breaker 14 to the plugged-in position represented in FIG. 6, thus performing connection between the circuit breaker terminals 34, 36 and the connection strips 62, 64 of the frame by means of the draw-in finger contacts 66, 68. During this phase, the movable terminal block 92 slides in the guide slides 96 and remains connected to the auxiliary connectors 86 of the circuit breaker. The movement of the draw-in mechanism 70 is reversible and withdrawal also comprises two phases, a first phase of movement of the circuit breaker to its plugged-out position achieving disconnection of the circuit, and a second phase of disconnection of the auxiliary circuits. With such a device, each state of the switchgear apparatus i.e. the "plugged-out" state in which the main and auxiliary circuits of the circuit breaker are disconnected, the "test" state in which the auxiliary circuits are connected whereas the main circuits are still disconnected, and the "plugged-in" state in which the main and auxiliary circuits are connected—corresponds unambiguously to an angular position characteristic of the draw-in shaft, and a position characteristic of the cross-member 98 of the terminal block 92, which moves while remaining parallel to itself on an L-shaped trajectory with respect to the frame.

Figure 7:
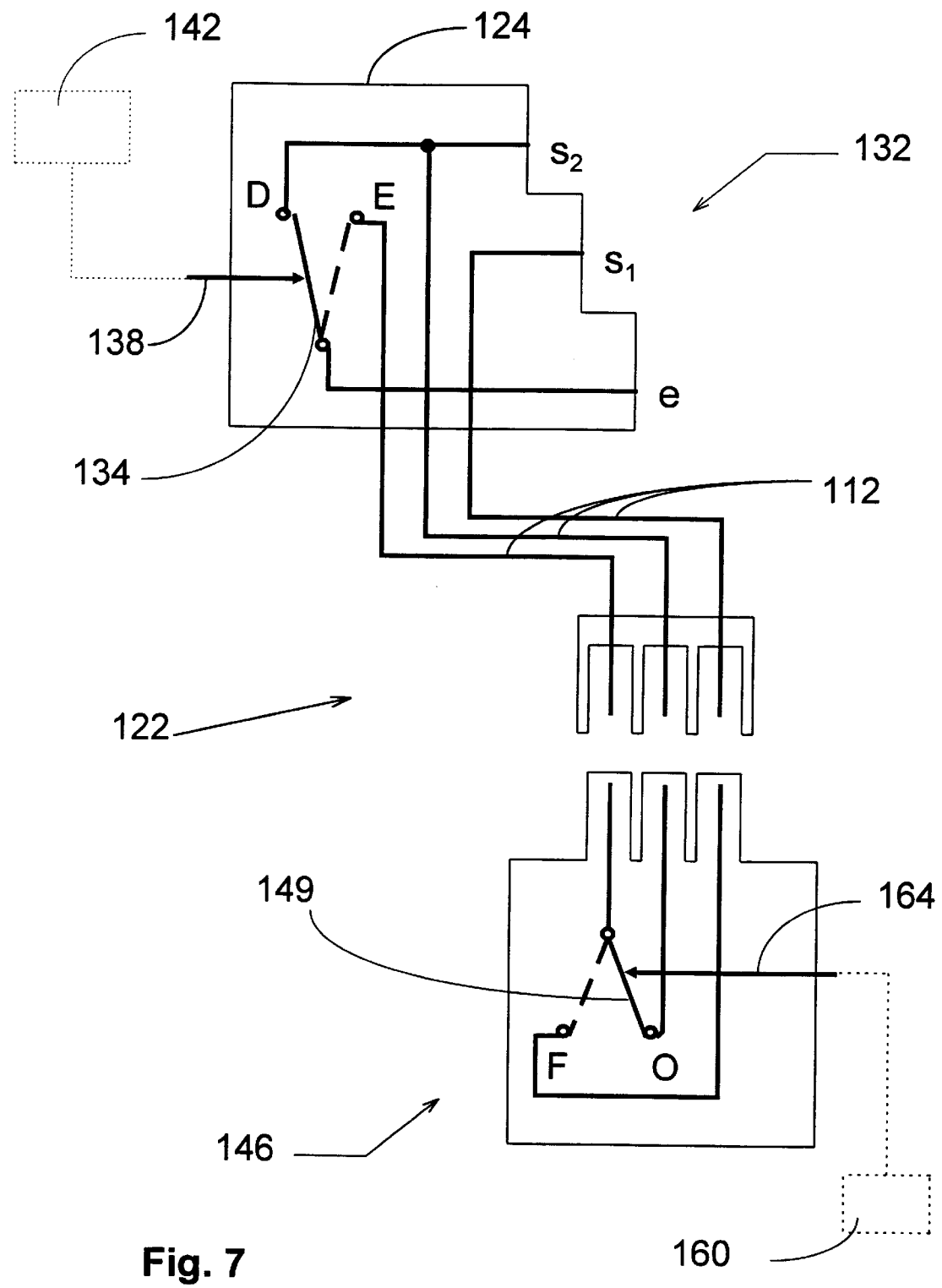
FIG. 7 schematically represents a state indicating device of the apparatus of FIG. 1.
Figure 8:
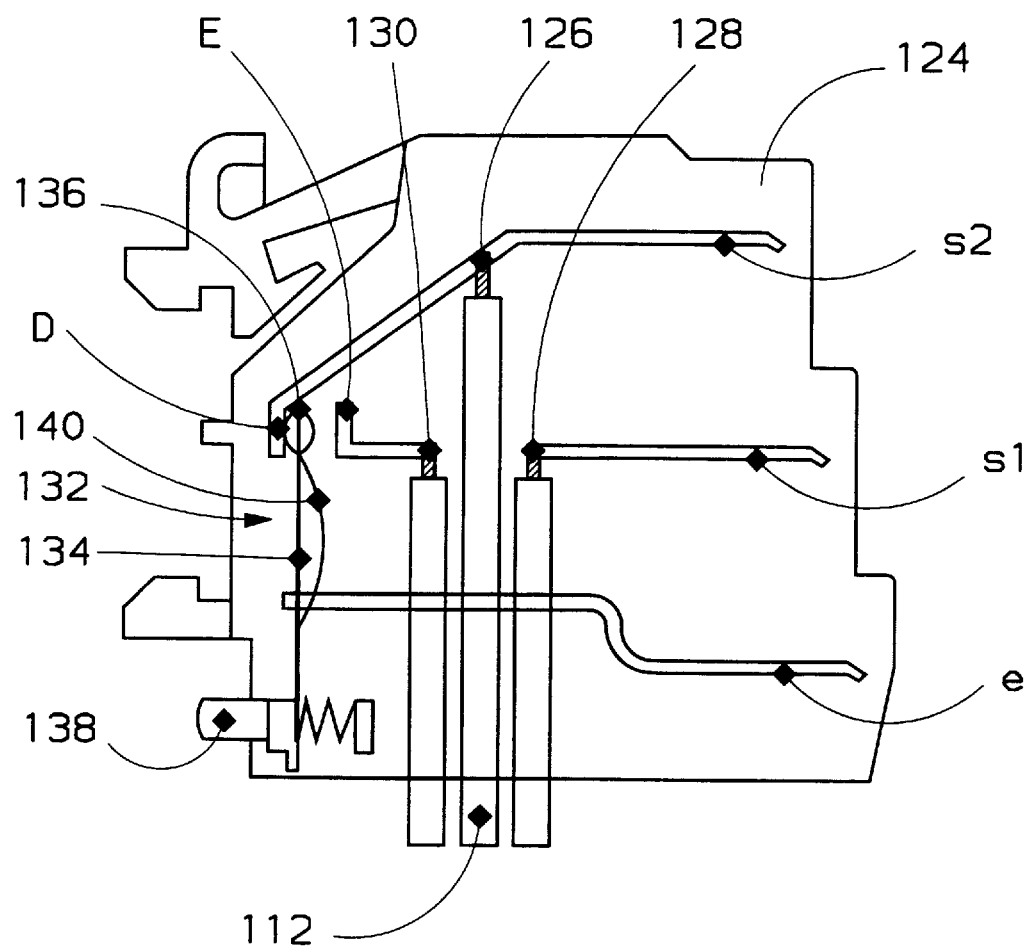
FIG. 8 represents a case comprising a part of the state indicating device of FIG. 7.
Figure 9:
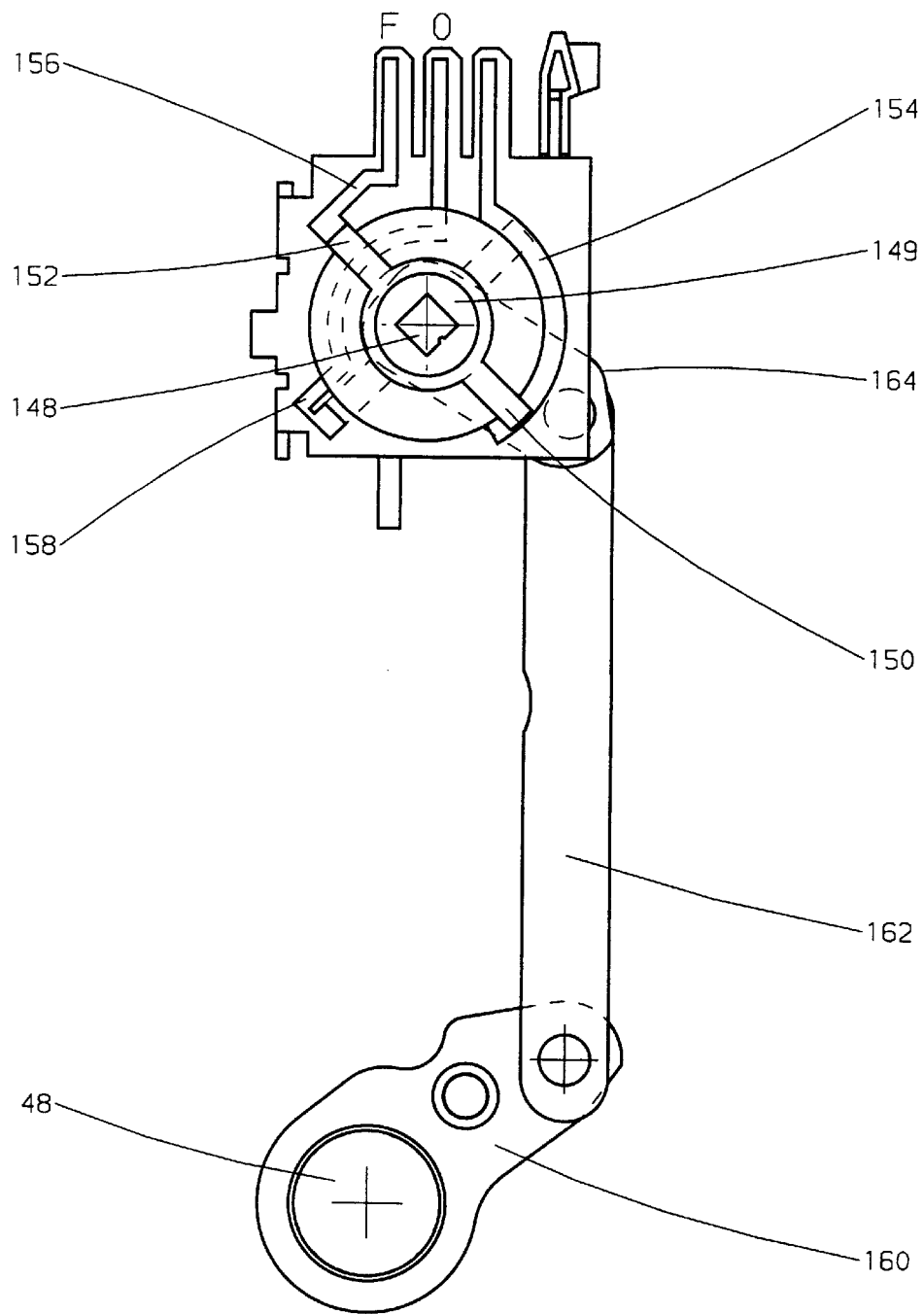
FIG. 9 represents another part of the device of FIG. 7.

FIG. 7 represents the frame 12 of the switchgear apparatus without the connection terminal block 110, which reveals a support base 154 of said terminal block. The support base 154 comprises recesses 156, three in this example. Each recess laterally comprises two supports for receipt of a pivoting spindle 144 (visible in FIGS. 8 to 10) of a lever 142, 146, 152 respectively. As the recesses are of identical shapes as are the spindles of the different levers 142, 146, 152, it is possible to switch the levers at will.

Each recess 156 enables three identical adjacent switches to be fixed. One of these switches 132 is represented schematically in FIG. 8. The switch comprises a case 124 designed to be integrated in the fixed connection terminal block 110 of the frame. This case 124 comprises three external connection terminals "e", "$S_1$", "$s_2$" and contains a movable switching means 134 securedly affixed to a pushbutton 138. The push-button 138 is guided in translation with respect to the case 124 and one of its ends emerges from the case 124. The switching means and the push-button are flexibly biased to a rest position corresponding to an extracted position of the pushbutton by a spring 140. At rest, the push-button is out and the circuit is closed between "e" and "$s_1$" and open between "e" and "$s_2$". When the push-button is actuated, the circuit opens between "e" and "$s_1$" and closes between "e" and "$s_2$".

A drive arm of the lever 142, pivoting around the spindle 144 supported by the support base 154 actuates the three push-buttons 138 of the three adjacent switches 132 fixed to the recess 156.

Figure 6:
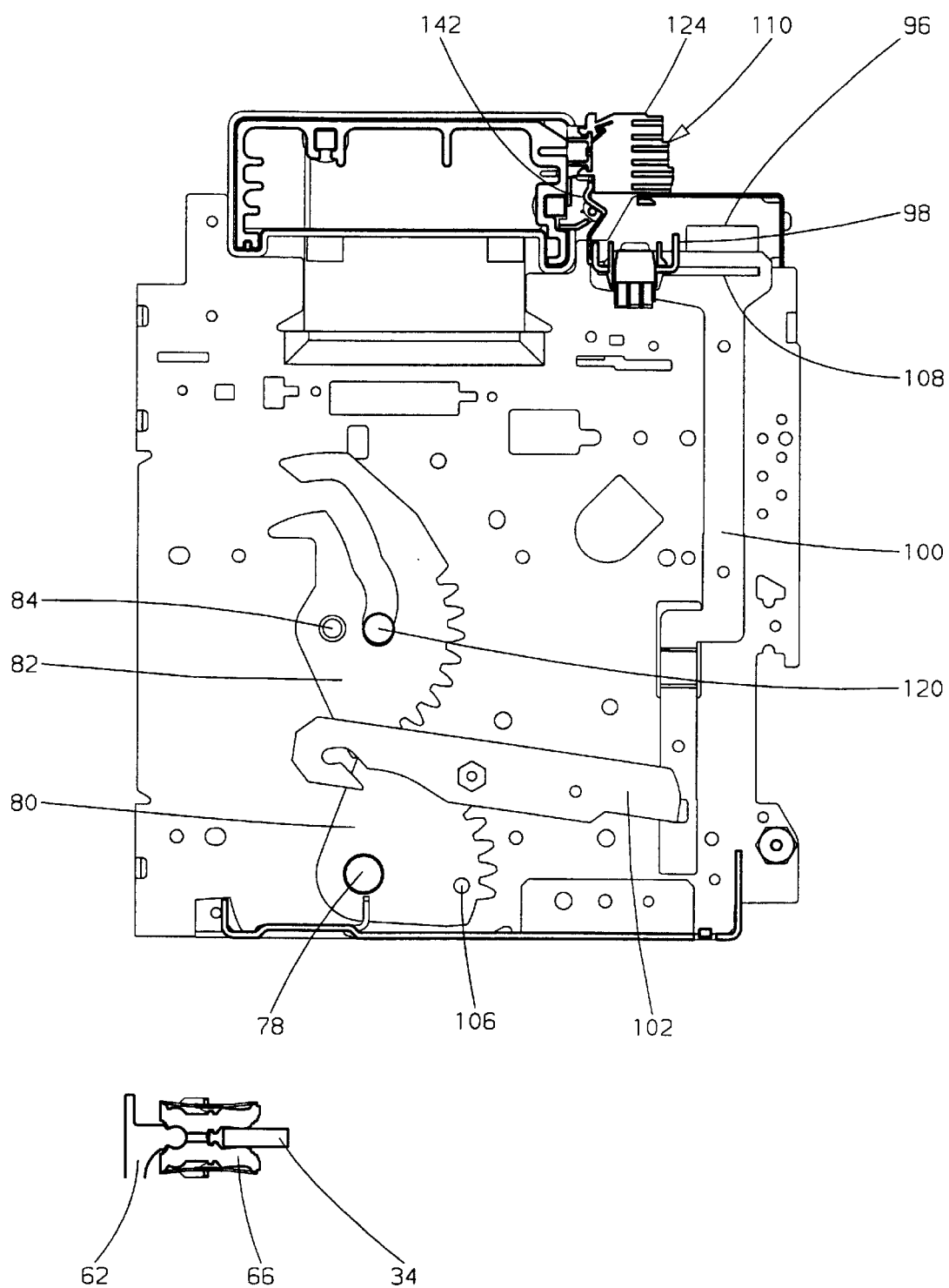
FIG. 6 represents certain elements of the frame in a "plugged-in" state of the apparatus of FIG. 1.

The switchgear apparatus according to the invention comprises a state indicating device 122 represented schematically in FIG. 7. The device comprises a case 124 represented more precisely in FIG. 8, designed to be integrated in the fixed connection terminal block 110 of the frame. This case 124 comprises three external connection terminals "e", "$s_1$", "$s_2$" and three connection terminals 126, 128, 130 for connection to the bundle of flexible conductors 112. It houses a first switch 132 comprising an input and two outputs "E" and "D". A conductor circuit, internal to the case 124, connects the connection terminals, the input and the outputs of the switch 132. The external connection terminals each comprise a rigid metal pin. The switch comprises a movable switching means 134 formed by a flexible conducting metal strip, one end of which is equipped with a contact pad 136 and the other end of which is secured to a push-button 138. The push-button 138 is guided in translation with respect to the case 124 and one of its ends emerges from the case 124. The strip comprises a U-shaped center cut-out defining a hole for passage, fixing and connection to the input metal conductor "e" and a secondary strip 140 one end of which is connected by folding to the body of the strip 134, the other end pressing on an edge of the rigid conductor. The strip 134 is thus urged in flexion and, at rest, its pad 136 moves and presses against the second output "D" of the switch whereas the end secured to the push-button 138 pushes the latter to a raised position. When the push-button 138 is depressed, to the right in the figure, the flexion of the strip 134 is modified and its pad 136 then presses against the first output "E" of the switch, thus performing switching of the circuit. As soon as the external pressure on the push-button is released, the strip returns to its rest position. The push-button 138 is urged by one end of a lever 142 pivoting around a spindle 144 secured to the frame 12. The other end of the lever 142 is designed to operate in conjunction with the support cross-member 98 of the movable terminal block 92, as can be seen in FIG. 6.

So long as the cross-member 98 does not press against the stop formed by the left part of the guide slide 96 and the slide rack 108 of the 100, the lever does not act on the push-button, so that the first switch 132 remains in its rest position corresponding to electrical connection between the input of the switch and the output "D". As soon as the cross-member 98 of the mechanism 70 reaches the extreme position of FIG. 6, the lever is actuated and depresses the push-button, which acts on the movable switching means in such a way as to move the pad 136 into contact with the output "E" of the switch, establishing electrical connection of this output with the input of the switch.

The state indicating device in addition comprises a second switch 146 repeating the open or closed condition of the main contact means 22, 24. This switch, which can be seen in detail in FIG. 9, comprises an input and two outputs "0" and "F" and a shaft 148 to which a metal bridge 149 is connected comprising a central track electrically connecting two diametral contacts 150, 152. When the pole shaft 48 moves from its open position to its closed position, it drives the shaft 148 by means of a kinematic system comprising a crank 160 linked to the pole shaft 48 and acting as position detection means of the shaft 48, a transmission rod 162 and a receiver crank 164 linked to the shaft 148, so that the contacts 150, 152 pivot reversibly from their position in an unbroken line to their position in a broken line in FIG. 9. The contact 150 still remains in contact with the track 154 connected to the input, whereas the contact 152 moves from a track 156 connected to the output "F" to a track 158 (broken line) connected to the output "0".

Figure 10:
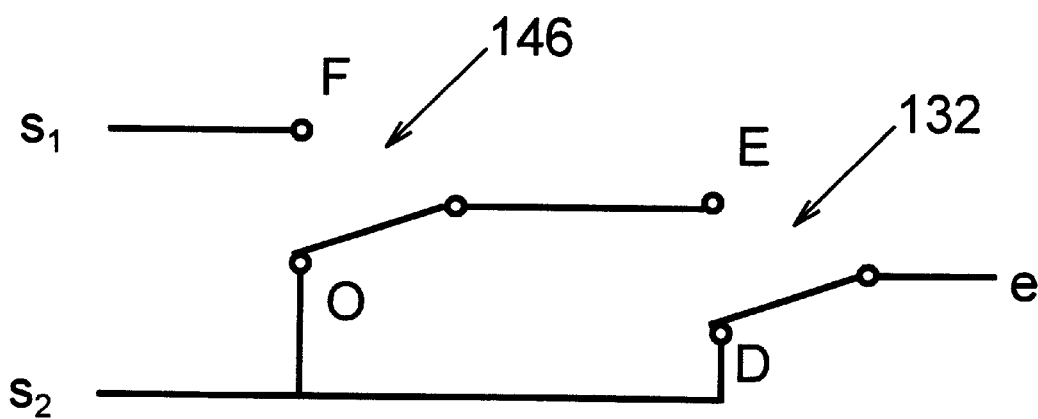
FIG. 10 represents a wiring diagram of the state indicating device of FIG. 7.

The wiring diagram achieved with the switches is shown in FIG. 10. It comprises an up-line switch connected with the input terminal "e" of the state indicating device, i.e. the first switch 132, and a down-line switch connected to the first output terminal "$s_1$,", i.e. the second switch 146. The input "e" is electrically connected to the first output "$s_1$" if and only if the first switch connects its input to the output "E" and if the second switch connects its input to the output "F", which corresponds to the conjunction of two events, i.e.: firstly, the fact that the switchgear apparatus is in its plugged-in state indicated by the fact that the lever 142 constituting the detection means of the plugged-in position of the cross-member 98 of the mechanism 70 is in its active position pressing on the push-button 138, and secondly, the fact that the contact means are closed indicated by the position of the pole shaft 48. In the opposite case, i.e. if the contact means are open or if the switchgear apparatus is not in its plugged-in state, the input "e" of the device is connected to the output "$s_2$".

Figure 11:
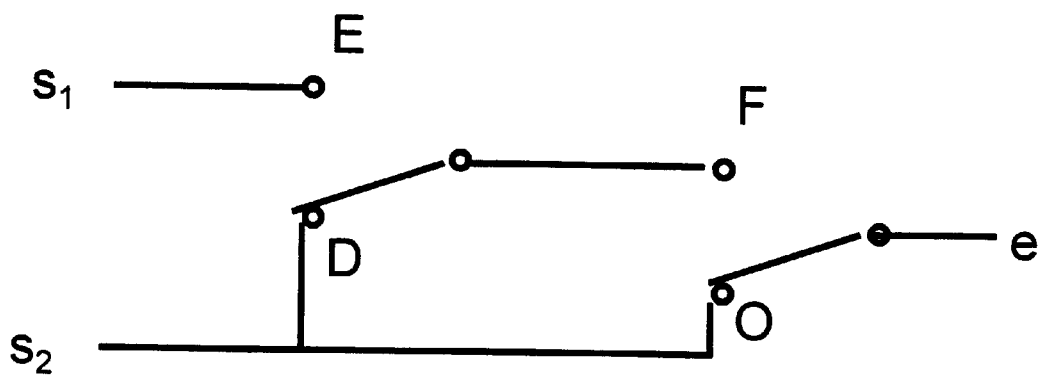
FIG. 11 represents a wiring diagram of a state indicating device according to a second embodiment of the invention.
Figure 12:
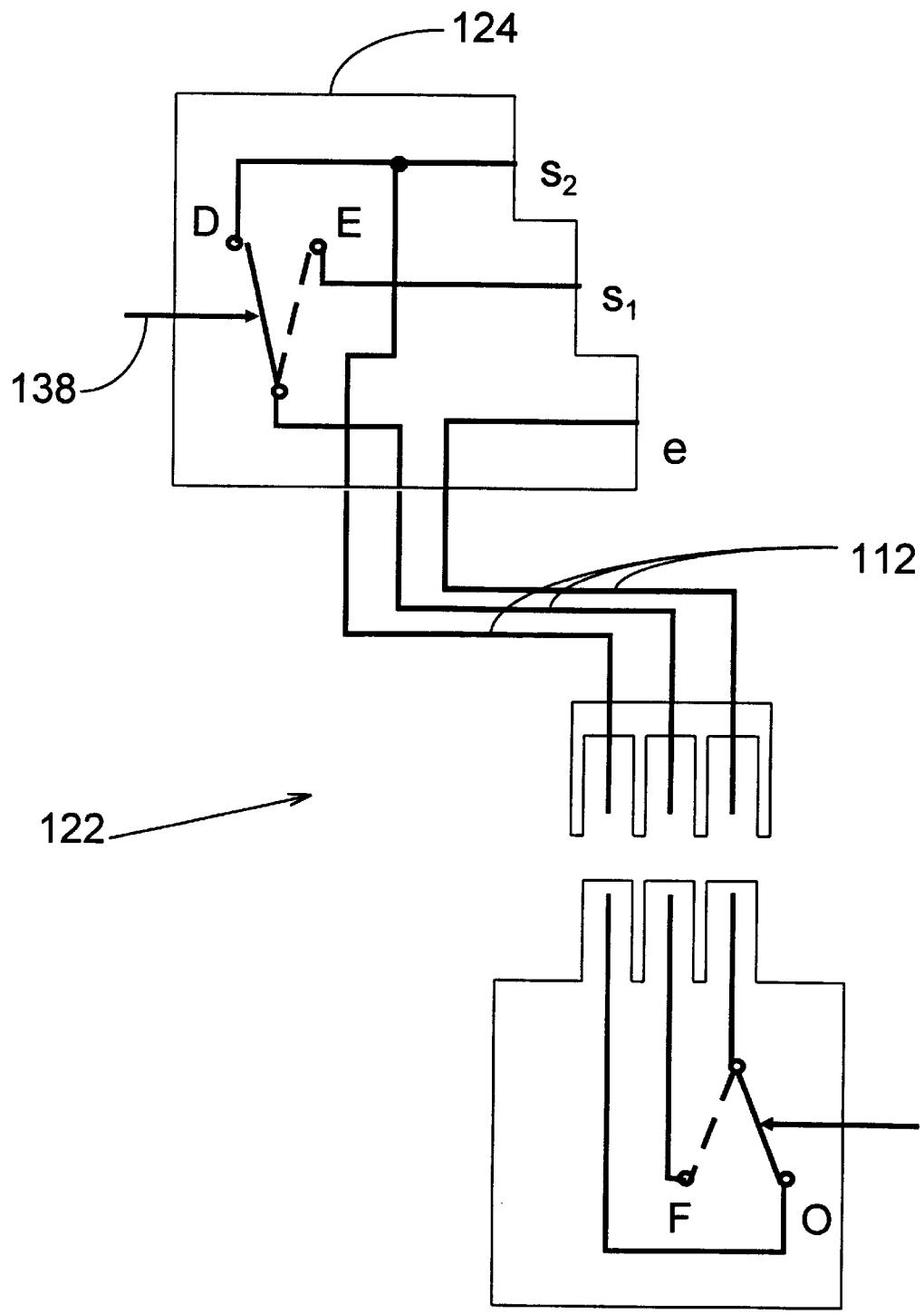
FIG. 12 schematically represents the state indicating device according to the second embodiment of the invention.

Naturally the invention is not limited to the embodiment described above. It can be envisaged to arrange the switches in the reverse manner, as shown in FIG. 11. The up-line switch is then the switch 146 and the down-line switch is the first switch 132. It is however advisable to house the first switch in the terminal block 110. Connection is then performed according to the diagram of FIG. 12, with the down-line switch formed by the switch 132 and housed in the case 124.

Figure 13:
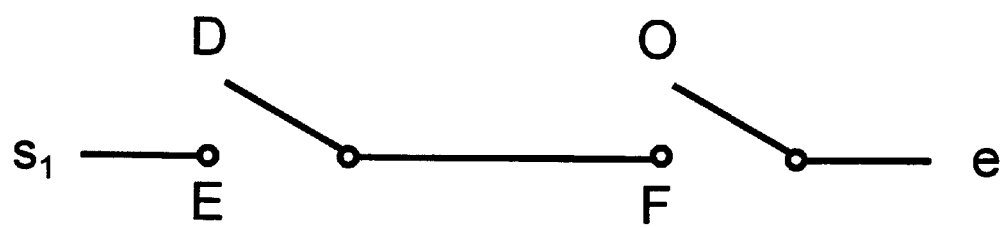
FIG. 13 represents a wiring diagram of a state indicating device according to a third embodiment of the invention.

It is also possible to simplify the wiring diagram of the state indicating device by providing a single output "$s_1$", as shown schematically in FIG. 13.

Figure 14:
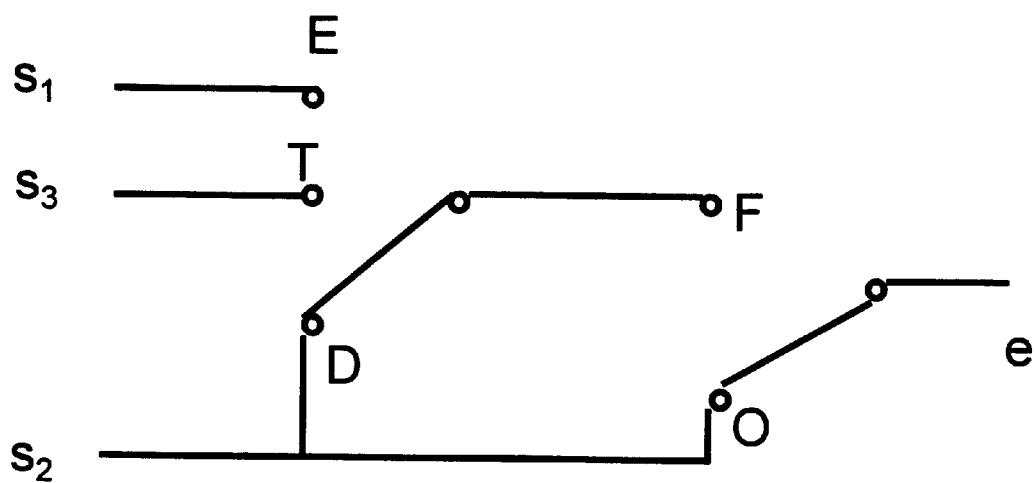
FIG. 14 represents a wiring diagram of a state indicating device according to a third embodiment of the invention.

It is further possible to arrange for one of the switches to have more than two switching positions. If the first switch is involved, three positions can be provided: "E" corresponding to the plugged-in state, "T" corresponding to the test state and "D" corresponding to the plugged-out state. A state indicating device comprising such a switch is represented schematically in FIG. 14. The state indicator then has one input and three outputs $s_1$, $s_2$ and $s_3$. The electrical circuit is conducting between e and $s_1$ if and only if the contacts are open AND the switchgear apparatus is plugged-in. The circuit is closed between e and $s_3$ if and only if the contacts are open and the switchgear apparatus is in the test position. Finally, the circuit is closed between e and $s_2$ in all the other cases.

In the embodiments described hitherto, the plug-in and plug-out mechanism does not move the circuit breaker between the plugged-out state and the test state. The invention is however also applicable to a mechanism moving the circuit breaker in such a way that a single position of the circuit breaker between the plugged-out state and the plugged-in state corresponds unambiguously to each position of the mechanism. In such a case, it is not necessary to obtain the information relating to the state of the circuit breaker on the plug-in mechanism by detecting movement thereof with respect to the frame. It is on the contrary easier to obtain this information directly on the body of the circuit breaker by detecting movement thereof with respect to the frame. The invention is also applicable to a switchgear apparatus for which the "plugged-out" and "extracted" positions are the same.

Furthermore, the state indicating device according to the invention has been described in connection with a switchgear apparatus whose plug-in and plug-out mechanism is supported by the frame. It is however directly applicable to an apparatus whose plug-in and plug-out mechanism, or at least its primary means, is supported by the circuit breaker.

The state indicating device can also be used to determine other conditions of the switchgear apparatus. By modifying the lever 142, it is for example possible to make it act on the push-button 138 when the cross-member 98 leaves its retracted position. An indicator of the "contact means closed" AND "circuit breaker somewhere between its test position and plugged-in position" state is thus obtained. It is also possible to shape the lever 142 in such a way that it depresses the push-button only when the cross-member is in its test position. An indicator of the "contact means closed" AND "circuit breaker in test position" state is thus obtained. Other alternative embodiments can naturally be envisaged.

As far as the structure of the first switch is concerned, it is possible to replace the flexible strip 134 by any other assembly performing the same functions, i.e. the electrical switching function and the function of flexible return to one of the two positions. A helicoidal spring acting directly on the push-button and a rigid movable means can for example be provided. It can also be envisaged to replace the push-button by another kinematic connecting means between the lever 142 and the movable means 134 of the switch, for example by an intermediate lever pivoting around a spindle secured to the case 124. Alternatively, the kinematic connecting means can be achieved directly by an extension of the movable means 134 protruding outwards from the case.

What is claimed is:

1. An electrical switchgear apparatus, comprising:
   a fixed frame;
   a circuit breaker in the fixed frame, the circuit breaker comprising at least one pair of main contact means movable between a closed, electrical conducting position, and an open, breaking position;
   a plug-in and plug-out mechanism to reversibly move the circuit breaker between plugged-out and plugged-in positions;
   a first movable means to detect indexed positions and indexed position intervals of the plug-in and plug-out mechanism, the first movable means taking an active position in response to detection of the indexed position of the plug-in and plug-out mechanism;
   a second movable means to detect an indexed position of the pair of main contact means, the second movable means taking an active position when the pair of main contact means is in the indexed position; and
   a state indicating device comprising,
      an input terminal,
      a first output terminal,
      a first switch attached to the first movable means, the first switch comprising,
         a first switch input,
         a first switch first output, and
         a first switch switching means to connect the first switch inputs and outputs in a first position,
         the first position of the first switch only attainable when the first movable means is in the active position of the first movable means,
      a second switch attached to the second movable means, comprising,
         a second switch input,
         a second switch first output, and
         a second switch switching means to connect the second switch input and output in a first position of the second switch, when the second movable means is in the active position of the second movable means, and
      an electrical circuit to connect the first and second switches, and the input and first output terminals, the input and first output terminals connecting when the switching means of the first switch is in the first position of the first switching means and the switching means of the second switch is in the first position of the second switching means, each switching means connected to the corresponding detecting means by a kinematic connecting means, whereby when the detecting means is in the active position, the corresponding switching means is in the first position.

2. The apparatus of claim 1, wherein the first and second switches are line-side and load-side switches, respectively;
   the input of the line-side switch connects to the input terminal of the state indicating device;
   the output of the load-side switch connects to the first output terminal of the state indicating device; and
   the first output of the line-side switch, connections to the input of the load-side switch.

3. The apparatus of claim 2, wherein the state indicating device has a case to contain the input terminal, the first output terminal, and either the line-side, or load-side switch.

4. The apparatus of claim 2, wherein:
   the line-side and load-side switches each have a second output,
   the switching means of the line-side switch is in a second position when the input of the line-side switch is not connected to the first output of the line-side switch, and the input of the line-side switch is electrically connected to the second output of the line-side switch,
   the switching means of the load-side switch is in a second position when the input of the load-side switch is not connected to the first output of the load-side switch, and the input of the load-side switch is electrically connected to the second output of the load-side switch; and
   the state indicating device comprises a second output terminal connected to the second output terminal of the state indicating device, and the second output of the line-side switch connects to the second output of the load-side switch.

5. The apparatus of claim 4, wherein the state indicating device has a case to contain the input terminal, the first and second output terminals, and either the line-side, or load-side switch.

6. The apparatus of claim 3, wherein the circuit breaker comprises auxiliary connectors to connect auxiliary electrical circuits of the circuit breaker to the frame which has a terminal block for connection to the auxiliary connectors and a customer connection terminal block, the case in one of the terminal blocks.

7. The apparatus of claim 6, the case containing the first switch.

8. The apparatus of claim 1, wherein at least one kinematic connecting means comprise a flexible return means.

9. The apparatus of claim 2, wherein the line-side switch is the first switch.

* * * * *